US011144830B2

(12) United States Patent
Bottaro et al.

(10) Patent No.: US 11,144,830 B2
(45) Date of Patent: Oct. 12, 2021

(54) ENTITY LINKING VIA DISAMBIGUATION USING MACHINE LEARNING TECHNIQUES

(71) Applicant: Microsoft Technology Licensing, LLC, Redmond, WA (US)

(72) Inventors: Juan Pablo Bottaro, Dublin (IE); Majid Yazdani, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 928 days.

(21) Appl. No.: 15/820,128

(22) Filed: Nov. 21, 2017

(65) Prior Publication Data

US 2019/0156212 A1 May 23, 2019

(51) Int. Cl.
| | |
|---|---|
| *G06F 16/35* | (2019.01) |
| *G06N 3/08* | (2006.01) |
| *G06N 3/04* | (2006.01) |
| *G06F 16/951* | (2019.01) |
| *G06F 16/33* | (2019.01) |
| *H04L 29/06* | (2006.01) |
| *H04L 29/08* | (2006.01) |

(52) U.S. Cl.
CPC ......... *G06N 3/084* (2013.01); *G06F 16/3331* (2019.01); *G06F 16/35* (2019.01); *G06F 16/951* (2019.01); *G06N 3/04* (2013.01); *G06N 3/0445* (2013.01); *G06N 3/088* (2013.01); *H04L 67/306* (2013.01); *H04L 67/42* (2013.01)

(58) Field of Classification Search
CPC ........ G06N 3/084; G06N 3/04; G06N 3/0445; G06N 3/088; G06F 16/35; G06F 16/951; G06F 16/3331; H04L 67/306; H04L 67/42

USPC ..................................................... 706/20, 10
See application file for complete search history.

(56) References Cited

U.S. PATENT DOCUMENTS

| | | | |
|---|---|---|---|
| 11,042,811 B2* | 6/2021 | Rolfe | G06N 3/0472 |
| 2016/0189047 A1* | 6/2016 | Meij | G06F 40/295 |
| | | | 706/11 |

OTHER PUBLICATIONS

Leveraging Deep Neural Networks and Knowledge Graphs for Entity Disambiguation (Year: 2015).*
Leveraging Deep Neural Netwrks and Knowledge Graph for Entity Disambiguation (Year: 2015).*
Best of Both Worlds: Transferring Knowledge from Discriminative Learning to a Generative Visual Dialog Model (Year: 2017).*

(Continued)

*Primary Examiner* — Michael J Huntley
*Assistant Examiner* — Em N Trieu
(74) *Attorney, Agent, or Firm* — Schwegman Lundberg & Woessner, P.A.

(57) ABSTRACT

In an example, for each of one or more terms in a text document, one or more entities to which the term potentially maps are identified. The text document includes at least one ambiguous term. One or more features are extracted from the text document. An attention model is applied to the text document based on the extracted one or more features, resulting in an attention weight being applied to each of the one or more terms in the text document. The one or more terms are encoded based on the attention weights. Each of one or more ambiguous terms is classified based on the encoded terms, the classification assigning a value to each different entity that each ambiguous term potentially maps to. A minimum entropy loss function is evaluated using the classification, and results are back-propagated to the attention model.

20 Claims, 8 Drawing Sheets

(56) References Cited

OTHER PUBLICATIONS

NeuPL: Attention-based Semantic Matching and Pair-Linking for Entity Disambiguation (Year: 2017).*

Paying More Attention To Attention: Improving the Performance of Convolutional Neural Networks via Attention Transfer (Year: 2017).*

An Error-Entropy Minimization Algorithm for Supervised Training of Nonlinear Adaptive Systems (Year: 2002).*

UKF Based Nonlinear Filtering Using Minimum Entropy Criterion (Year: 2013).*

Modeling Mention, Context and Entity with Neural Networks for Entity Disambiguation (Year: 2015).*

Jin, et al., "Entity Linking at the Tail: Sparse Signals, Unknown Entities, and Phrase Models", In Proceedings of the 7th ACM international conference on Web search and data mining, Feb. 24, 2014, 10 Pages.

Dredze, et al., "Entity Disambiguation for Knowledge Base Population", In Proceedings of the 23rd International Conference on Computational Linguistics, Aug. 23, 2010, 9 Pages.

Ganea, et al., "Probabilistic Bag-Of-Hyperlinks Model for Entity Linking", In Proceedings of the 25th International Conference on World Wide Web, Jan. 29, 2016, 12 Pages.

Lin, et al., "Entity Linking at Web Scale", In Proceedings of the Joint Workshop on Automatic Knowledge Base Construction and Web-scale Knowledge Extraction, Jun. 7, 2012, 5 Pages.

Mihalcea, et al., "Wikify!: linking documents to encyclopedic knowledge", Retrieved From: https://www.semanticscholar.org/paper/Wikify!%3A-linking-documents-to-encyclopedic-Mihalcea-Csomai/93cbd1f313dad71b355a9743fba64182e63c3b81 :, Jan. 2007, 3 Pages.

Ratinov, et al., "Local and Global Algorithms for Disambiguation to Wikipedia", In Proceedings of the 49th Annual Meeting of the Association for Computational Linguistics: Human Language Technologies vol. 1, Jun. 19, 2011, 10 Pages.

* cited by examiner

ENTITY LINKING VIA DISAMBIGUATION USING MACHINE LEARNING TECHNIQUES

TECHNICAL FIELD

The present disclosure generally relates to technical problems encountered in linking entities in computer networks. More particularly, the present disclosure relates to entity linking via disambiguation using machine learning techniques.

BACKGROUND

Users may perform searches on text contained in documents over computer networks. For example, a user may search millions or billions of articles, web sites, product listings, or other Objects by entering a search query. It is common for the search results to contain terms that match one or more terms in the search query. For example, if a user performs a search on "pubs in Scotland," articles containing the terms "pub" and "Scotland" may be returned. Some search algorithms are advanced enough to expand the search results based on terms frequently appearing in the matching search results. For example, if many articles containing the terms "pub" and "Scotland" also mention "Glasgow," then the term "Glasgow" may be deemed to be related to this search query, and thus the search results may be expanded to include search results that contain the terms "pub" and "Glasgow" but that do not contain the term "Scotland."

A technical problem, however, is encountered for terms whose meanings or importance may be ambiguous. In the above example, if many articles containing the terms "pub" and "Scotland" also contain the term "Perth," the algorithm may return search results containing the terms "pub" and "Perth," but some of these results would be incorrect, because Perth is not just a city in Scotland but is also a city in Australia. The search engine does not know how to distinguish between the Perth in Scotland and the Perth in Australia, and thus may return results for pubs in Australia, which would not be useful to the user.

This problem is compounded in the realm of certain types of social networking services where proper nouns such as individual names, business names, school names, locations, industries, etc. are each assigned individual identifications based on their underlying meaning. In a social networking service, for example, there may be two different identifications sharing the same name of "Perth," one corresponding to Perth, Australia, and one corresponding to Perth, Scotland. Each of these may be called an "entity," and thus there can be multiple entities sharing the same name. A similar problem can be encountered with common people's names, such as "John Smith," where there could be thousands of entities with the name "John Smith."

What is needed is a solution that is able to disambiguate such entities on a large scale for use in high-volume computer networks.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an unsupervised machine learning technique is implemented to refine an entity linking model to disambiguate entities. No labeled data is required, and the unsupervised machine learning technique can be applied to millions of documents. The unsupervised machine learning technique finds the entity that can distinguish itself most from the other similar entities. This can be based on an attention mechanism applied to the text and each candidate's features, so that the resulting distribution over the candidates has the lowest entropy.

The attention may be a distribution over the words in the text. The higher the attention on a word, the more weight in the prediction. The rationale is that if it is possible to construct an attention that minimizes the entropy of the output, then the resulting distribution will likely be favoring one of the entries. If no such attention can be found that distinguishes one or a small subset from the rest, then the machine learning technique can reject the given candidates.

Figure 1:
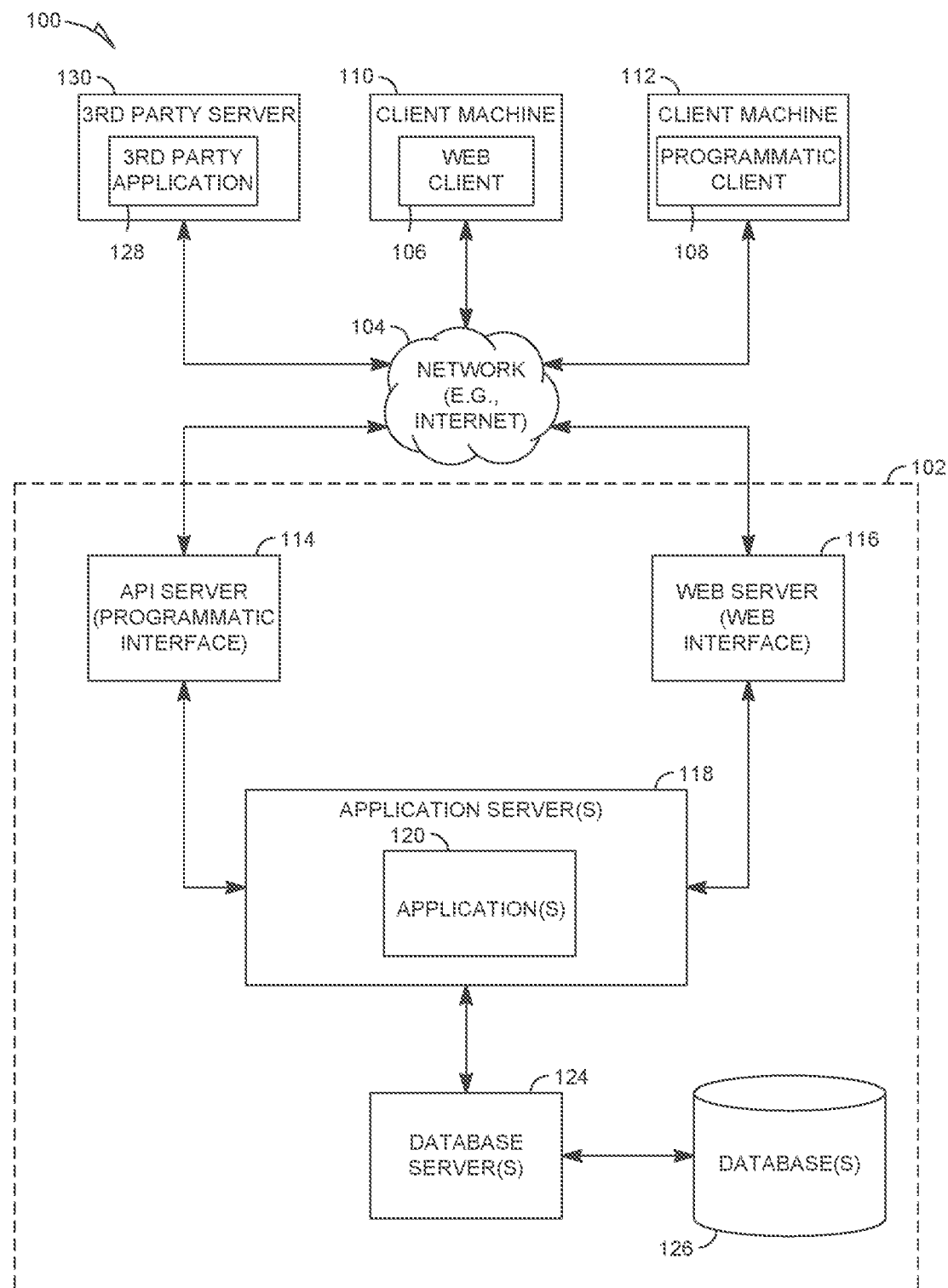
FIG. 1 is a block diagram illustrating a client-server system, in accordance with an example embodiment.

FIG. 1 is a block diagram illustrating a client-server system 100, in accordance with an example embodiment. A networked system 102 provides server-side functionality, via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
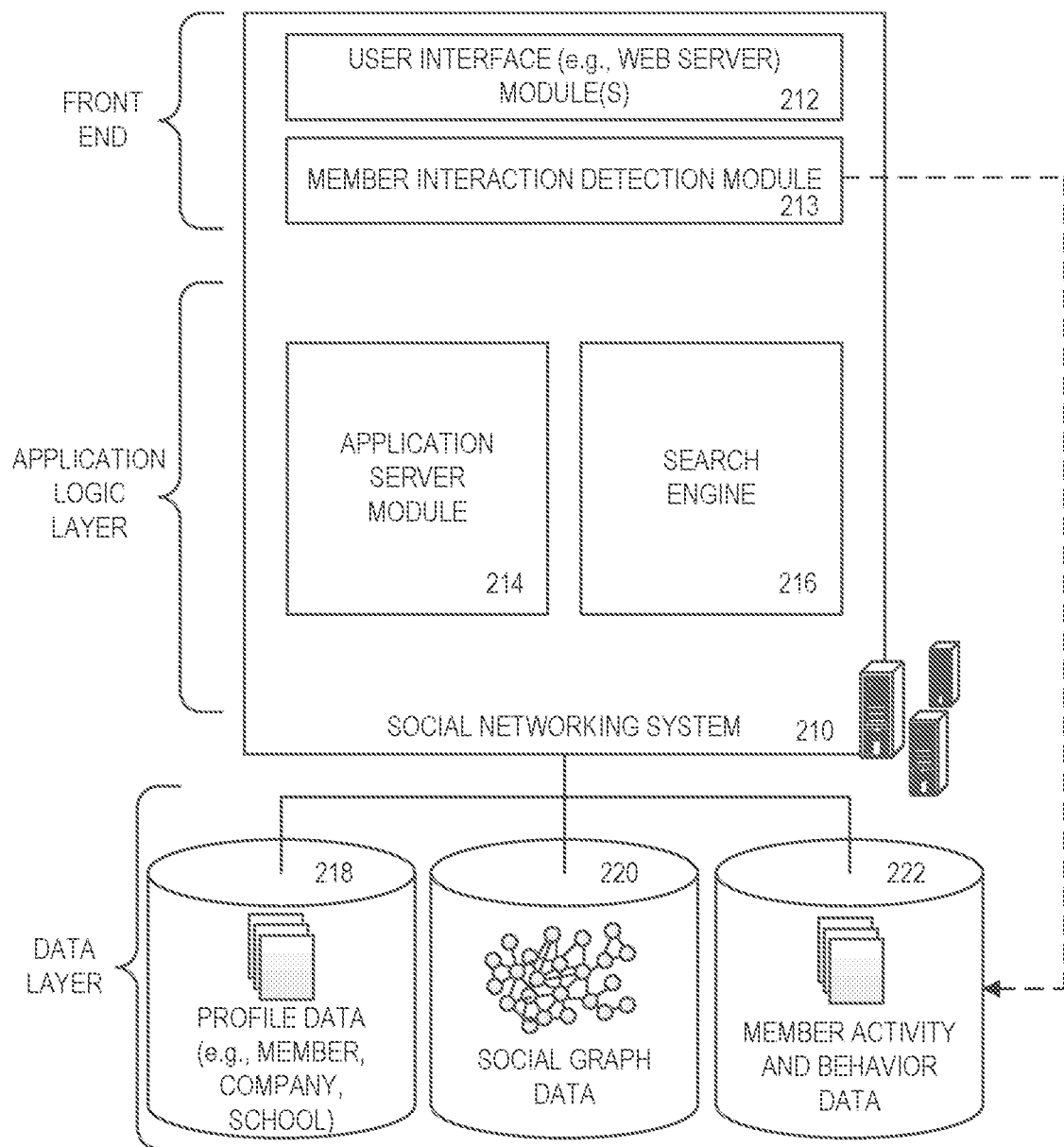
FIG. 2 is a block diagram showing the functional components of a social networking system, consistent with some embodiments of the present disclosure.

In some embodiments, the networked system 102 may comprise functional components of a social networking service. FIG. 2 is a block diagram showing the functional components of a social networking system 210, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
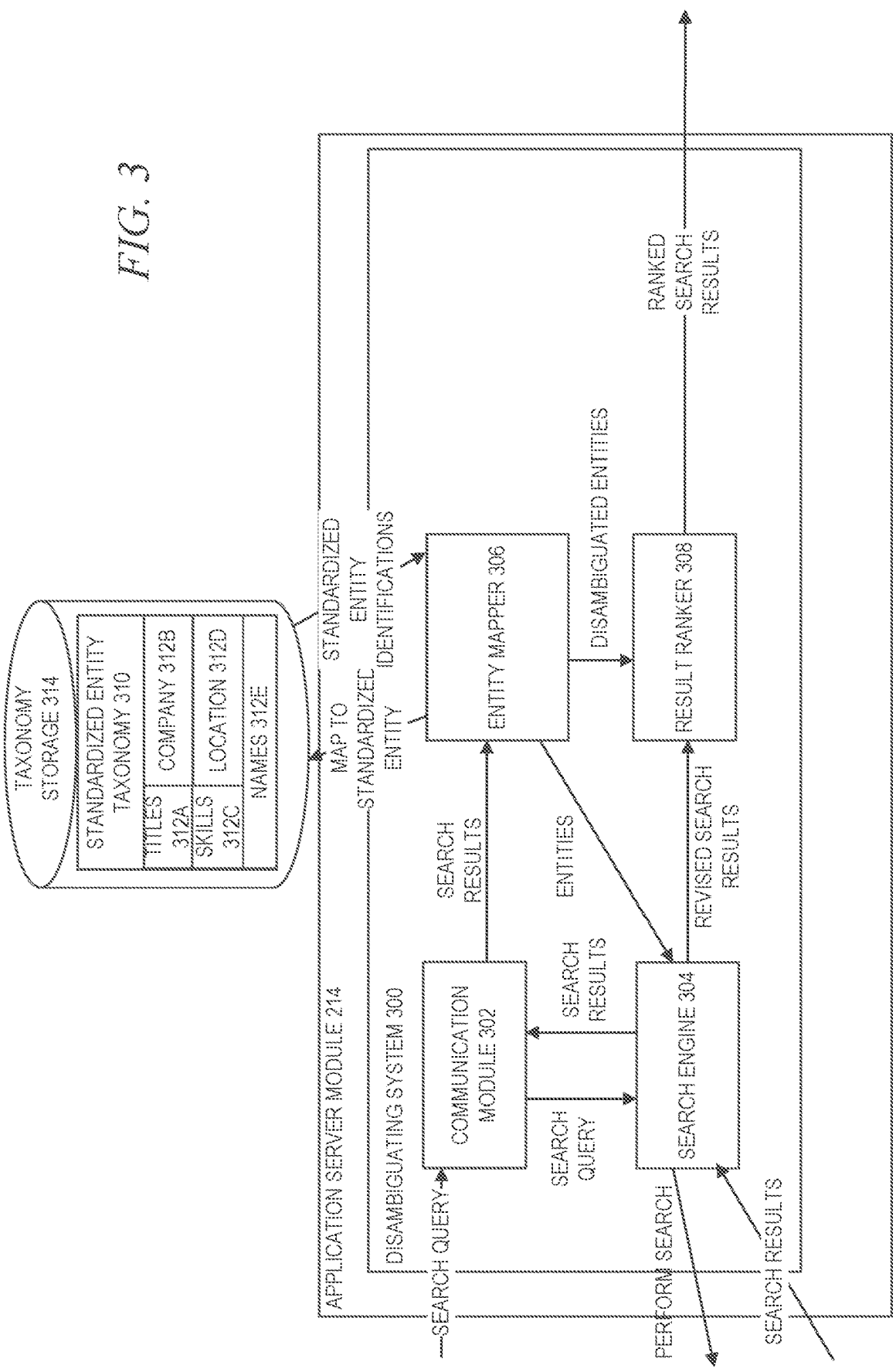
FIG. 3 is a block diagram illustrating an application server module in more detail, in accordance with an example embodiment.

FIG. 3 is a block diagram illustrating the application server module 214 of FIG. 2 in more detail. While in many embodiments the application server module 214 will contain many subcomponents used to perform various different actions within the social networking system 210, in FIG. 3 only those components that are relevant to the present disclosure are depicted. A disambiguating system 300 includes a communication module 302. The communication module 302 is configured to perform various communication functions to facilitate the functionality described herein. For example, the communication module 302 may communicate with users via the network 104 using a wired or wireless connection to obtain a search query. The communication module 302 may then forward the search query to a search engine 304, which may perform a search, based on the search query, on a document corpus. This document corpus may be from any database, but in an example embodiment may include a database of news articles.

The search engine 304 may obtain one or more search results based on the search query, and return these results to the communication module 302. The communication module 302 may then pass these search results to an entity mapper 306. The entity mapper 306 acts to map words in the search results to one or more entities stored in a standardized entity taxonomy 310. The standardized entity taxonomy 310 may include an indication of various standardized entities and corresponding entity identifications (such as unique numbers corresponding to each entity). The standardized entity taxonomy 310 may include various portions devoted to different taxonomy categories, such as, for example, a titles portion 312A, a company portion 312B, a skills portion 312C, a location portion 312D, and a names portion 312E. In other embodiments, each of these portions 312A-312E may be stored as its own independent taxonomy. There are, of course, other types of words that may be part of the taxonomy depending on implementation, such as schools.

In some example embodiments, the standardized entity taxonomy 310 may comprise a data structure that includes different levels of a hierarchy, such as a tree graph. This allows some of the standardized entities to be parents or children of other standardized entities, reflecting a hierarchical relationship between them. For example, the titles of "software engineer" and "software developer" both may be children nodes of a higher-level title known as "computer scientist."

The standardized entity taxonomy 3110 may be stored in, for example, a taxonomy storage 314. It should be noted that while in some example embodiments the standardized entity taxonomy 310 may be used to identify candidate entities, in other example embodiments other knowledge bases could be used either in lieu of or in addition to the standardized entity taxonomy 310.

The entity mapper 306 thus obtains standardized entity names and/or identifications (collectively known as entities) for one or more words in the search results, as well as disambiguated entities for any ambiguous entities. These entities and disambiguated entities may be utilized in a number of different ways. In one example embodiment, the entities are passed to the search engine 304, which then performs a revised search based on the original search query augmented with entities related to those entities that were identified from the original search results. In another example embodiment, the disambiguated entities are passed to a result ranker 308, which acts to rank the search results based on the disambiguated entities, such as by using the disambiguated entities as a focus or filter on the search results, or simply applying a higher weighting to the disambiguated entities than to the other possible entities of the ambiguous entities. Referring back to the earlier example of cities in Scotland, the entities identified by the entity mapper 306 may include a first entity for Perth, Scotland, and a second entity for Perth, Australia. The result ranker 308 may then rank the search results that are believed to refer to Perth, Scotland, higher than those believed to refer to Perth, Australia, even in cases where the term "Scotland" appears in neither.

The ranked search results may then be sent to a user interface for display.

It should be noted that while the present disclosure discusses application of the various disambiguation actions for terms in a search result, these same actions could be applied to terms in any text document. As such, nothing in this disclosure shall be interpreted as limiting the scope of protection to disambiguation of terms in search results.

Figure 4:
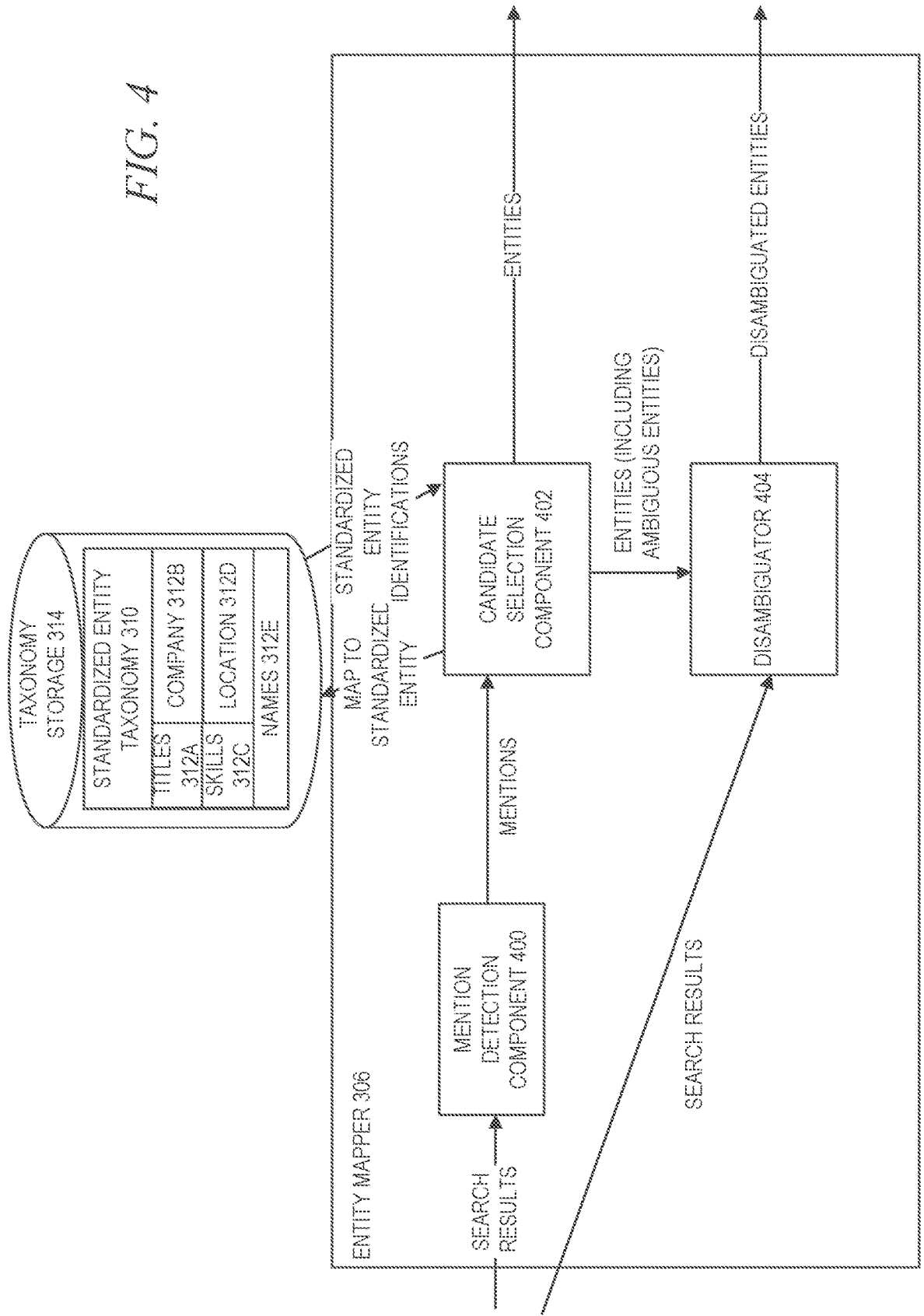
FIG. 4 is a block diagram illustrating an entity mapper in more detail, in accordance with an example embodiment.

FIG. 4 is a block diagram illustrating the entity mapper 306 in more detail, in accordance with an example embodiment. Each search result is passed to a mention detection component 400, which detects individual terms mentioned in each document. A candidate selection component 402 then identifies candidate entities matching the mentioned terms, from the standardized entity taxonomy 310. The entities, which may include ambiguous entities, specifically those entities, which match mentions in the search results, that contain the same name yet are different entities, are then passed to a disambiguator 404, which disambiguates the ambiguous entities. For each set of ambiguous entities (a set being defined as different entities that share the same name), a single entity is chosen using one or more machine learning models. The disambiguated entities (namely the set of single entities chosen) are then output from the disambiguator 404 and used as described earlier.

Figure 5:
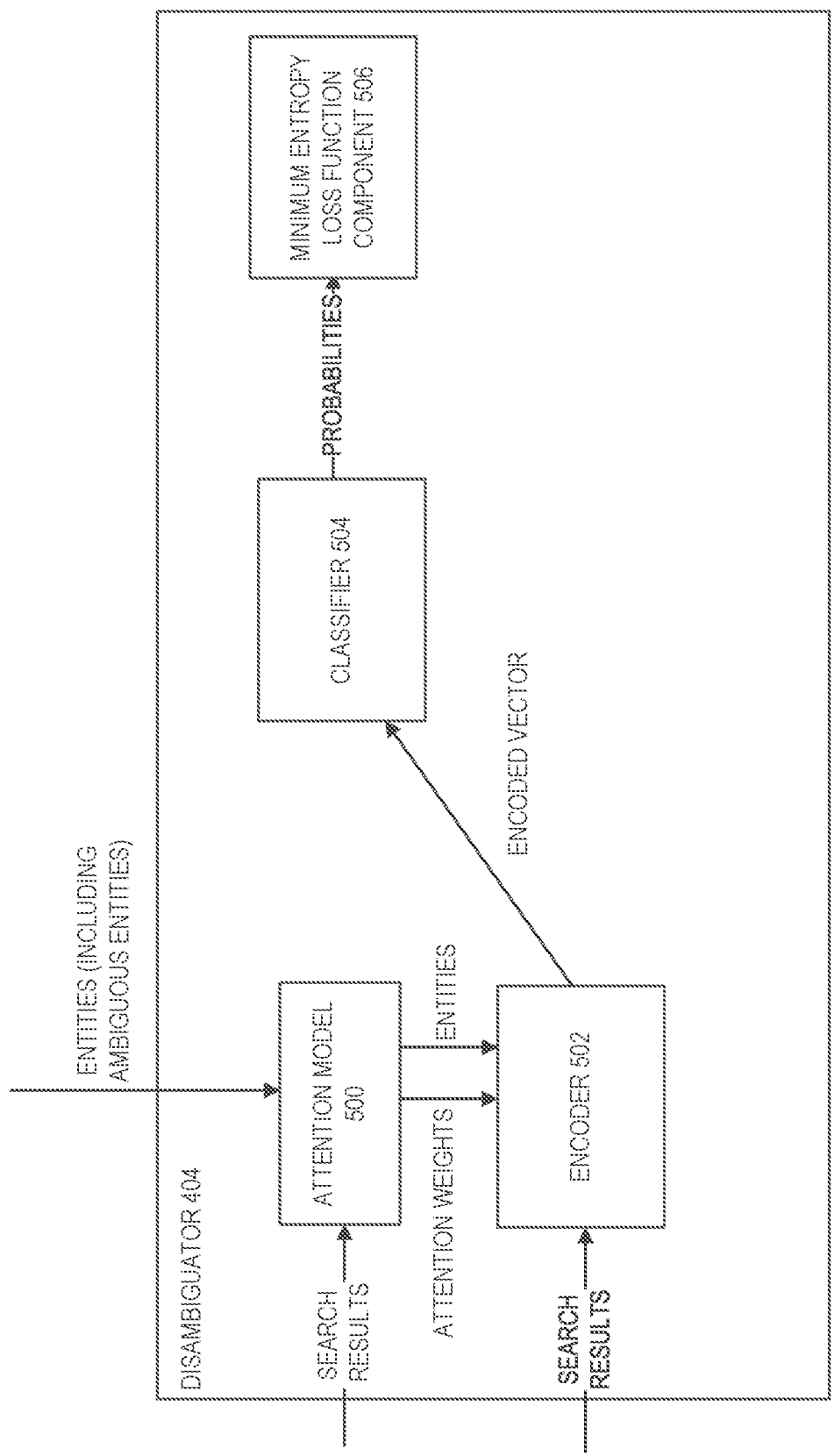
FIG. 5 is a block diagram illustrating a disambiguator in more detail, in accordance with an example embodiment.

FIG. 5 is a block diagram illustrating the disambiguator 404 in more detail, in accordance with an example embodiment. Input to the disambiguator 404 may include the search results and the ambiguous entities. In some example embodiments, the search results may be in the form of one or more features of the actual documents that are identified by the search results. These features are commonly the words in the text, but in some example embodiments other features may be used.

The goal of the disambiguator 404 is to identify, for each set of ambiguous entities, the "correct" entity. This objective may be explained as trying to find evidence in the text that strongly points to one of the candidates, or makes it highly distinguishable. An attention model 500 may be used to assign a weight to each word in a search result to help distinguish entities from one another. The attention model 500 performs this task in a way that results in a distribution over the candidates that has the lowest entropy without the need for labeled data. Entropy in this context refers to the average amount of information produced by a probabilistic stochastic source of data. The measure of information entropy associated with each possible data value is the negative logarithm of the probability mass function for the value. Thus, when the data source has a lower-probability value (i.e., when a low-probability event occurs), the event carries more "information" than when the data source has a higher-probability value. As such, entropy in the context of the present disclosure can be thought of as "spikiness" of a graph of scores assigned to candidates in a search result, with candidates on one axis and the scores on the other. The lower the entropy, the more distinct and pronounced "peaks" in the scores, and hence the graph is more spiky.

The attention model 500 applies weights to each term in a search result according to how it has been trained via a first machine learning algorithm. These weights are then sent to an encoder 502 that creates an embedding of the mentions and evidence. The attention may be a distribution over the words in the text. The higher the attention on a word, the more weight in the prediction. The attention model 500 may use one or more features in determining the weight. The features may include text-based features, such as location and frequency of terms in the search result. In an example embodiment, other features may be used as well. For example, an article written about Perth may not mention either Australia or Scotland, but the author of the article may be based in Scotland, which may be relevant to the meaning of "Perth" in the article. As such, author location may be a feature used by the attention model 500 in this manner.

The attention model 500 performs its functions based on the entities, including the ambiguous entities, mentioned in each search result. For example, a search result with the text "Perth is a city in Scotland" may mention the entities "Perth" (an ambiguous entity) and "Scotland" (a non-ambiguous entity). The attention model 500 may assign a weight to each of these entities and pass the weights and the entities to the encoder 502, which encodes the entities based on the weights. In one example embodiment, the encoder 502 may be a simple weighted sum function that creates vectors based on the weighted sums of the attention weights. In another example embodiment, a second machine learning algorithm may be used to train an encoding model for use in the encoder 502. For example, the encoder 502 may be a recurrent neural network (RNN).

An RNN is a class of neural networks where connections between units form a directed cycle. This allows it to exhibit dynamic temporal behavior and process arbitrary sequences of inputs. Examples of RNNs include full recurrent networks, recursive networks, Hopfield networks, bidirectional associative memory, Elman networks, Jordan networks, echo state networks, neural history compressors, long short-term memory, gated recurrent units, bi-directional networks, continuous-time networks, hierarchical networks, recurrent multilayer perceptrons, multiple timescales models, neural Turing machines, differentiable neural computers, and neural network pushdown automata. Training of neural networks may be performed via, for example, gradient descent or genetic algorithms.

The output of the encoder 502 is an encoded vector. The encoded vector may contain values for each of one or more features of the search result. As described above, these features may either be contained in the search result itself (or derived therefrom, such as statistics based on aspects of the search result), or be obtained from other data sources. For example, the search result may identify an author who has a member profile in a social networking service. The features could be extracted from this member profile to determine, for example, that the author is located in Scotland. It should be noted that, while in some example embodiments the features used by the encoder 502 are the same features as used by the attention model 500, in other example embodiments these features may be different. As such, a classifier 504 may add additional functionality not anticipated by the attention model 500.

This encoded vector is passed to a classifier 504. The classifier 504 acts to assign probability scores to the mentioned entities based on the encoded vector and output a distribution based on candidate ambiguous entities. The classifier 504 may be a model trained by a third machine learning algorithm, for example, a feedforward neural network. A feedforward neural network is one where connections between units do not form a cycle. Examples of feedforward neural networks include single-layer perceptrons and multi-layer perceptrons.

It should be noted that other types of deep neural networks could be used by the encoder and classifier, and nothing in this disclosure shall be interpreted as limiting the scope of protection to merely RNNs or feedforward neural networks.

In some example embodiments, this may include the use of a softmax function. The probability scores may then be passed to a minimum entropy loss function component 506, which measures the entropy of the resultant probability scores and indicates whether that entropy has reached a minimum. This information is back-propagated to whatever machine learning models are used in the disambiguator 404, including, for example, the attention model 500, encoder 502, and/or classifier 504. Since this back-propagation occurs, the disambiguator 404 may essentially be repeating this entire process (using slight variations in the models) until the minimum entropy loss function component 506 indicates that a minimum entropy has been reached (for example, that the entropy changes by less than a predetermined threshold amount from cycle to cycle).

Once the minimum entropy has been reached, the output from the classifier 504 may then be indicative of which of multiple ambiguous entities to select. For example, the output may indicate a higher probability score assigned to the Perth associated with Scotland than the Perth associated with Australia, and thus the disambiguator 404 may essentially select the "Perth, Scotland" entity as the "correct" entity. Similar results can be obtained for all of the ambiguous entities.

Referring back to the attention model 500, due to the back-propagation, various features of input search results may be varied in importance until an optimal combination and weighting is reached. For example, the attention model 500 may first assign a high weight to terms mentioned near entities in the text, but may later revise this weighting lower if it turns out that a lower weighting results in less entropy of the output of the classifier 504. Thus, the "attention" may be viewed as the variable that is optimized to obtain minimum entropy. Other possible features include, for example, term frequency-inverse document frequency (TF-IDF).

At training time, the back-propagation changes the parameters of the attention model, encoder, and/or classifier. The variables of the optimization are the parameters of the machine learning models. At inference time, however, the parameters of all models may be fixed, and the attention distribution is a variable that can be optimized by back-propagation for the min-entropy loss function over the distribution of the candidates.

Figure 6:
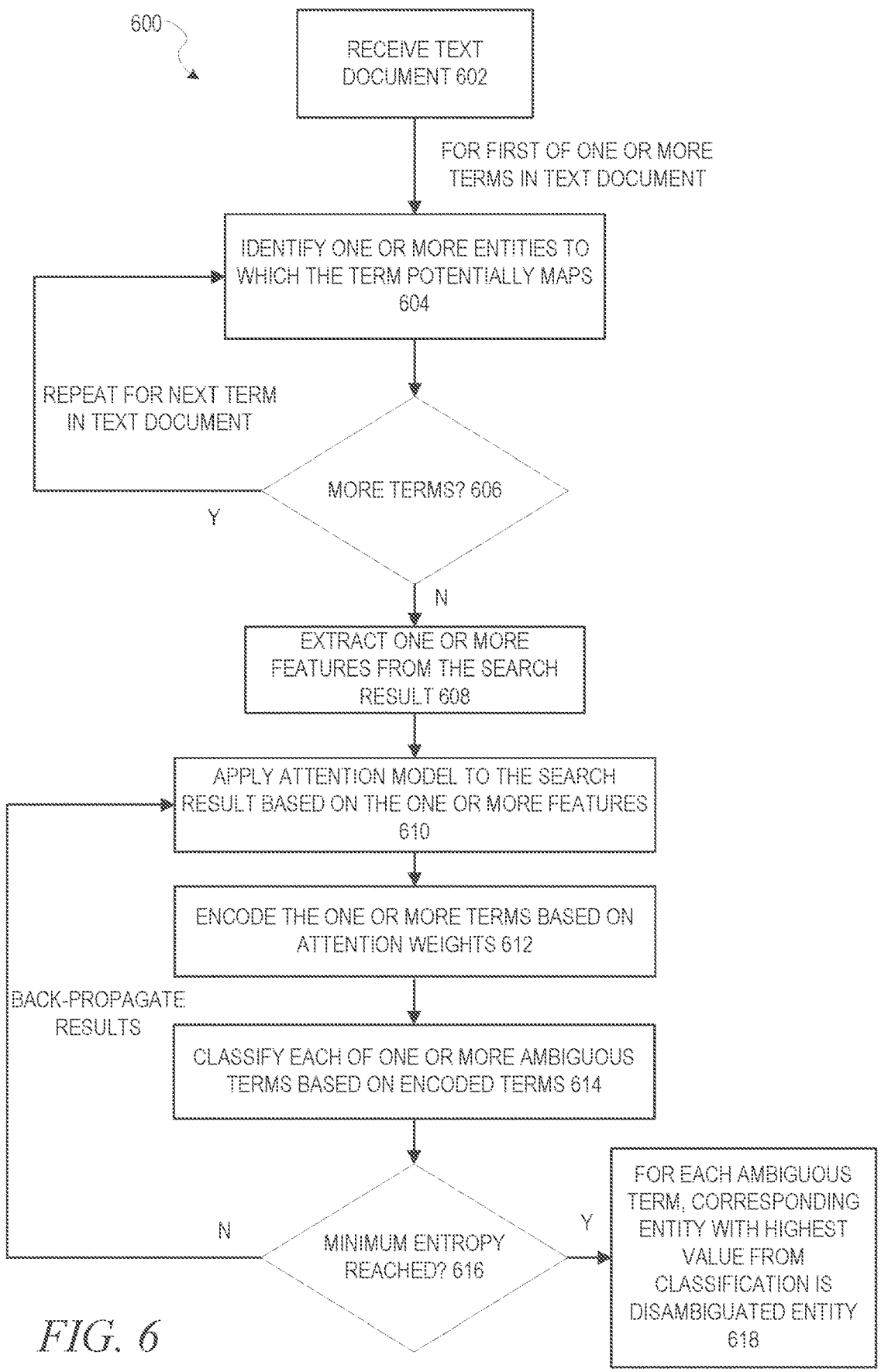
FIG. 6 is a flow diagram illustrating a method for disambiguating ambiguous entities in a search result, in accordance with an example embodiment.

FIG. 6 is a flow diagram illustrating a method 600 for disambiguating ambiguous entities in a search result, in accordance with an example embodiment. At operation 602, a text document is received. A loop may then be begun for each of one or more terms in the text document. At operation 604, one or more entities to which the term potentially maps are identified. The text document includes at least one ambiguous term, with an ambiguous term being a term that potentially maps to two different, but similarly named, entities. At operation 606, it may be determined if there are any more terms in the one or more terms in the text document. If so, then the method 600 loops back to operation 604 for the next term. If not, then at operation 608 one or more features are extracted from the text document. This may include features in the text document, features calculated based on information in the text document, and/or features derived from information in the text document, such as those retrieved from other data sources based on information in the text document.

At operation 610, an attention model is applied to the text document based on the extracted one or more features, resulting in an attention weight being applied to each of the one or more terms in the text document. At operation 612, the one or more terms are encoded based on the attention weights. At operation 614, each of one or more ambiguous terms are classified based on the encoded terms. The classification assigns a value to each different entity that each ambiguous term potentially maps to. At operation 616, a minimum entropy loss function is evaluated using the classification. If the minimum entropy has been reached, then at operation 618, for each ambiguous term, the corresponding entity with the highest value from the classification is deemed to be the disambiguated entity. If the minimum entropy has not been reached, this information is back-propagated to the attention model and the method 600 loops back to operation 610 for another iteration. In each iteration, the attention model produces a different result, until the minimum entropy loss function indicates that entropy in the classification has been minimized. It should be noted that this back-propagation may also apply to the encoding and/or classification as well.

Figure 7:
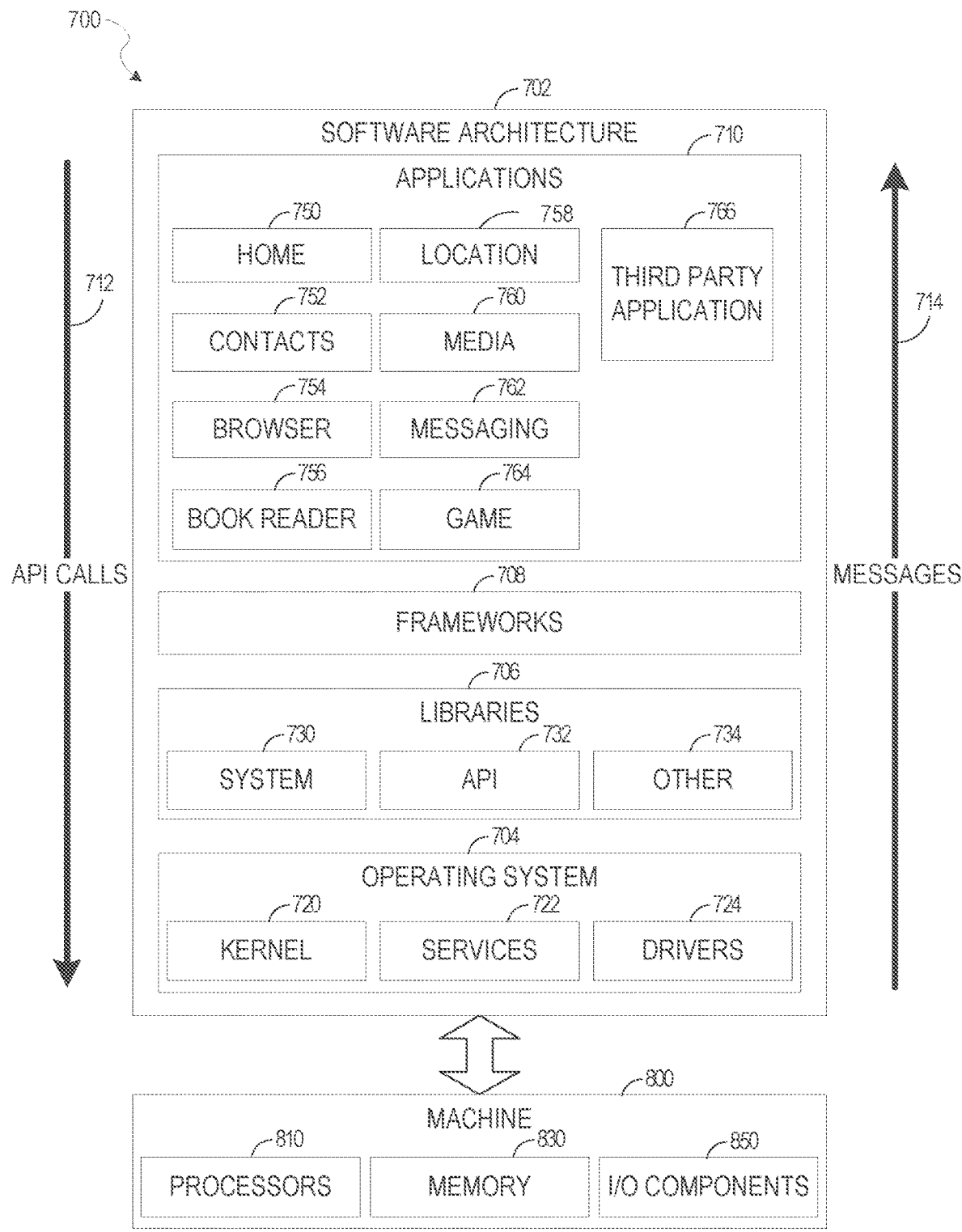
FIG. 7 is a block diagram illustrating an architecture of software, which can be installed on any one or more of the devices described above, according to an example embodiment.

FIG. 7 is a block diagram 700 illustrating an architecture of software architecture 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic, user interface (GUI) functions, high-level resource management, high-level location services, and so forth. The frameworks 708 can provide a broad spectrum of other APIs that can be utilized by the applications 710, some of which may be specific to a particular operating system or platform.

In an example embodiments, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
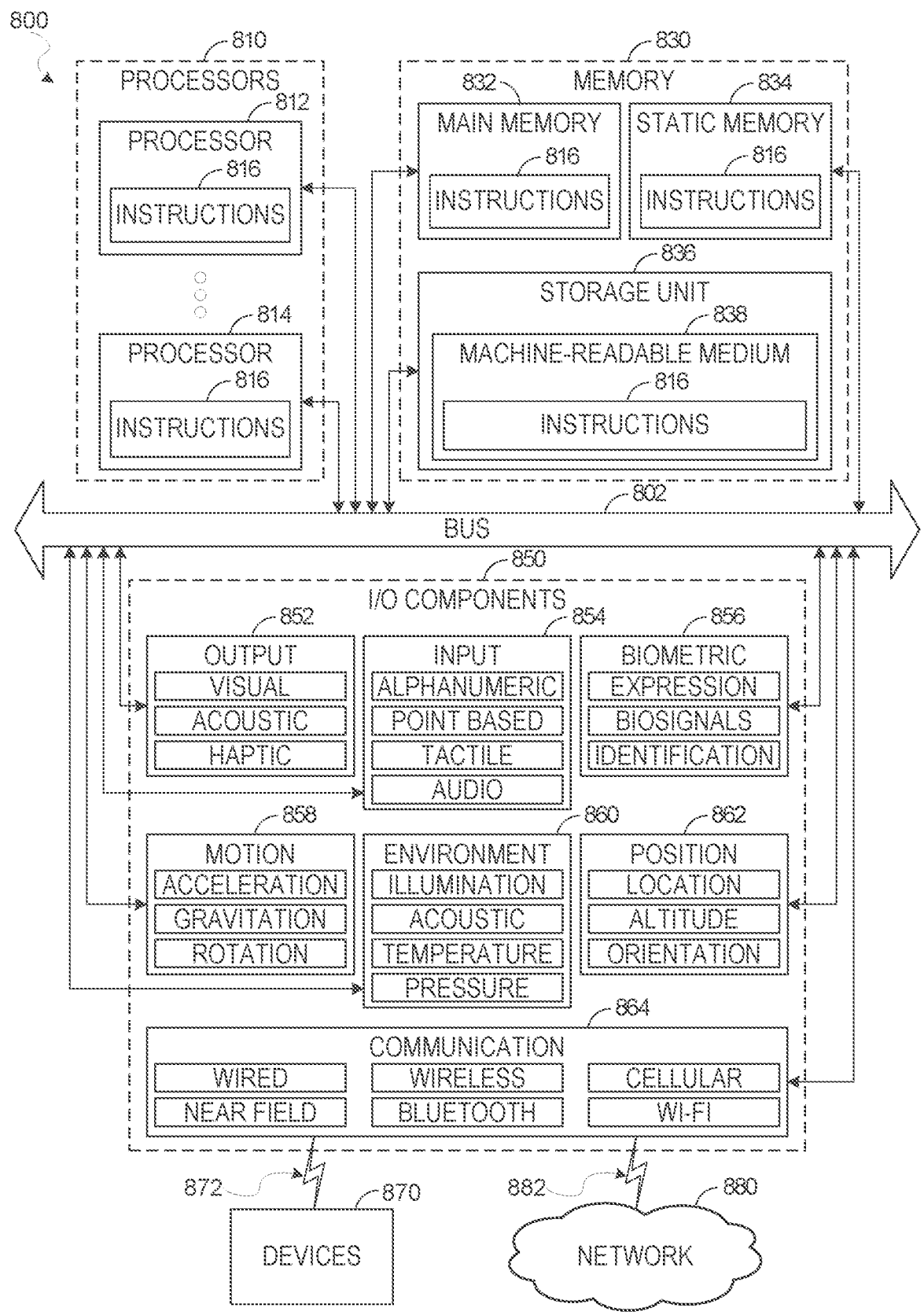
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or the storage unit 836 may store one or more sets of instructions and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

COMPUTER-READABLE MEDIUM

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a memory; and
   a computer-readable medium having instructions stored thereon, which, when executed by a processor, cause the system to:
   receive a text document;
   for each of one or more terms in the text document, identify one or more entities to which the term potentially maps, wherein the text document includes at least one ambiguous term, an ambiguous term being a term that potentially maps to two different, but similarly named, entities;
   extract one or more features from the text document;
   apply an attention model to the text document based on the extracted one or more features, resulting in an attention weight being applied to each of the one or more terms in the text document;
   encode the one or more terms based on the attention weights;
   classify each of one or more ambiguous terms based on the encoded terms, the classification assigning a value to each different entity that each ambiguous term potentially maps to;
   evaluate a minimum entropy loss function using the classification, by:
   measuring entropy of an iteration of the attention model by performing a negative logarithm of a probability mass function for a value in the iteration;
   determining that the measured entropy is lower than all previously measured entropies for the value in prior iterations of the attention model; and
   returning an indication that the measured entropy is lower than all previously measured entropies as a result of the minimum entropy loss function;
   and
   back-propagate results from the minimum entropy loss function to the attention model, causing the attention model to produce different results each time it is applied until the minimum entropy loss function indicates that entropy in the classification has been minimized.

2. The system of claim 1, wherein the encoding is performed using a recurrent neural network, and wherein the back-propagating includes back-propagating the results from the minimum entropy loss function to the recurrent neural network.

3. The system of claim 1, wherein the classifying is performed using a feedforward neural network, and wherein the back-propagating includes back-propagating the results from the minimum entropy loss function to the feedforward neural network.

4. The system of claim 1, wherein the attention model produces the different results each time it is applied by varying attention weights applied to the one or more features.

5. The system of claim 1, wherein the attention model produces the different results each time it is applied by varying what the one or more features are.

6. The system of claim 1, wherein the one or more features include term frequency-inverse document frequency (TF-IDF).

7. The system of claim 1, wherein the one or more features include one or more features extracted from a member profile of an author of the text document.

8. A computerized method comprising:
   receiving a text document;
   for each of one or more terms in the text document, identifying one or more entities to which the term potentially maps, wherein the text document includes at least one ambiguous term, an ambiguous term being a term that potentially maps to two different, but similarly named, entities;
   extracting one or more features from the text document;
   applying an attention model to the text document based on the extracted one or more features, resulting in an attention weight being applied to each of the one or more terms in the text document;
   encoding the one or more terms based on the attention weights;
   classifying each of one or more ambiguous terms based on the encoded terms, the classification assigning a value to each different entity that each ambiguous term potentially maps to;
   evaluating a minimum entropy loss function using the classification, by:
   measuring entropy of an iteration of the attention model by performing a negative logarithm of a probability mass function for a value in the iteration;
   determining that the measured entropy is lower than all previously measured entropies for the value in prior iterations of the attention model; and returning an indication that the measured entropy is lower than all previously measured entropies as a result of the minimum entropy loss function; and back-propagating results from the minimum entropy loss function to the attention model, causing the attention model to produce different results each time it is applied until the minimum entropy loss function indicates that entropy in the classification has been minimized.

9. The method of claim 8, wherein the encoding is performed using a recurrent neural network, and wherein the back-propagating includes back-propagating the results from the minimum entropy loss function to the recurrent neural network.

10. The method of claim 8, wherein the classifying is performed using a feedforward neural network, and wherein the back-propagating includes back-propagating the results from the minimum entropy loss function to the feedforward neural network.

11. The method of claim 8, wherein the attention model produces the different results each time it is applied by varying attention weights applied to the one or more features.

12. The method of claim 8, wherein the attention model produces the different results each time it is applied by varying what the one or more features are.

13. The method of claim 8, wherein the one or more features include term frequency-inverse document frequency (TF-IDF).

14. The method of claim 8, wherein the one or more features include one or more features extracted from a member profile of an author of the text document.

15. A non-transitory machine-readable storage medium comprising instructions, which when implemented by one or more machines, cause the one or more machines to perform operations comprising:

receiving a text document;

for each of one or more terms in the text document, identifying one or more entities to which the term potentially maps, wherein the text document includes at least one ambiguous term, an ambiguous term being a term that potentially maps to two different, but similarly named, entities;

extracting one or more features from the text document;

applying an attention model to the text document based on the extracted one or more features, resulting in an attention weight being applied to each of the one or more terms in the text document;

encoding the one or more terms based on the attention weights;

classifying each of one or more ambiguous terms based on the encoded terms, the classification assigning a value to each different entity that each ambiguous term potentially maps to;

evaluating a minimum entropy loss function using the classification, by:

measuring entropy of an iteration of the attention model by performing a negative logarithm of a probability mass function for a value in the iteration;

determining that the measured entropy is lower than all previously measured entropies for the value in prior iterations of the attention model; and returning an indication that the measured entropy is lower than all previously measured entropies as a result of the minimum entropy loss function; and back-propagating results from the minimum entropy loss function to the attention model, causing the attention model to produce different results each time it is applied until the minimum entropy loss function indicates that entropy in the classification has been minimized.

16. The non-transitory machine-readable storage medium of claim 15, wherein the encoding is performed using a recurrent neural network, and wherein the back-propagating includes back-propagating the results from the minimum entropy loss function to the recurrent neural network.

17. The non-transitory machine-readable storage medium of claim 15, wherein the classifying is performed using a feedforward neural network, and wherein the back-propagating includes back-propagating the results from the minimum entropy loss function to the feedforward neural network.

18. The non-transitory machine-readable storage medium of claim 15, wherein the attention model produces the different results each time it is applied by varying attention weights applied to the one or more features.

19. The non-transitory machine-readable storage medium of claim 15, wherein the attention model produces the different results each time it is applied by varying what the one or more features are.

20. The non-transitory machine-readable storage medium of claim 15, wherein the one or more features include term frequency-inverse document frequency (TF-IDF).

* * * * *